US012489281B2

(12) United States Patent
Sauvain (10) Patent No.: US 12,489,281 B2
(45) Date of Patent: Dec. 2, 2025

(54) CABLE ENCLOSURE HAVING A SEAL PORTION STRUCTURALLY CONFIGURED TO PROVIDE A SEALED ENCLOSURE AT MULTIPLE POSITIONS OF A COVER PORTION RELATIVE TO A BASE PORTION

(71) Applicant: PPC BROADBAND, INC., East Syracuse, NY (US)

(72) Inventor: Henry Sauvain, Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 18/757,763

(22) Filed: Jun. 28, 2024

(65) Prior Publication Data

US 2025/0007264 A1    Jan. 2, 2025

Related U.S. Application Data

(60) Provisional application No. 63/524,462, filed on Jun. 30, 2023.

(51) Int. Cl.
*H02G 3/08* (2006.01)
*B65D 45/16* (2006.01)
*H02G 15/10* (2006.01)

(52) U.S. Cl.
CPC ............. *H02G 3/088* (2013.01); *B65D 45/16* (2013.01); *H02G 15/10* (2013.01)

(58) Field of Classification Search
CPC ........ B65D 45/16; B65D 45/00; B65D 43/22; H02G 3/14; H02G 3/088; H02G 3/086;
(Continued)

(56) References Cited

U.S. PATENT DOCUMENTS 5,574,254 A * 11/1996 Mori ................. H02G 3/088
220/DIG. 14
2004/0144556 A1 * 7/2004 Dinh .................. H02G 3/14
174/67

(Continued)

FOREIGN PATENT DOCUMENTS

JP    H1022658 A    1/1998
JP    2013207114 A   10/2013
(Continued)

OTHER PUBLICATIONS

International Search Report and Written Opinion dated Oct. 16, 2024 in corresponding International Application No. PCT/US2024/035954, 15 pages.

*Primary Examiner* — Robert J Hicks
(74) *Attorney, Agent, or Firm* — MH2 TECHNOLOGY LAW GROUP LLP (57) ABSTRACT

An enclosure may be structurally configured to provide a sealed enclosure at multiple positions of a cover portion relative to a base portion. The enclosure may include a base portion having a base wall portion, a cover portion structurally configured to attach the base portion and including a cover wall portion, and a sealing portion structurally configured to be positioned between the cover wall portion and the base wall portion. The base wall portion and the cover wall portion may be configured to be disposed in a configuration such that base wall angle and the cover wall angle may be configured to provide a weatherproof seal between the cover wall portion and the base wall portion at multiple positions of the cover portion relative to the base portion, so as to provide a sealed enclosure at multiple positions of the cover portion relative to the base portion.

20 Claims, 9 Drawing Sheets

(58) Field of Classification Search
CPC .......... H02G 3/081; H02G 3/08; H02G 15/10;
H05K 5/06; H05K 5/0013; H05K 5/0004;
H01L 23/10
USPC ......... 220/324, 315, 378, 3.8, 3.3, 3.2, 4.02;
174/50.52, 50.51, 50.5, 564, 561, 560,
174/559
See application file for complete search history.

(56) References Cited

U.S. PATENT DOCUMENTS

| | | | |
|---|---|---|---|
| 2012/0307433 A1* | 12/2012 | Takahashi | H05K 5/15 361/679.01 |
| 2014/0374133 A1* | 12/2014 | Rost | H02G 3/088 174/50.51 |
| 2021/0100112 A1 | 4/2021 | Haag et al. | |

FOREIGN PATENT DOCUMENTS

| | | | |
|---|---|---|---|
| JP | 2017017096 A | 1/2017 |
| JP | 2023028074 A | 3/2023 |
| WO | 2020200851 A1 | 10/2020 |

* cited by examiner

CABLE ENCLOSURE HAVING A SEAL PORTION STRUCTURALLY CONFIGURED TO PROVIDE A SEALED ENCLOSURE AT MULTIPLE POSITIONS OF A COVER PORTION RELATIVE TO A BASE PORTION

TECHNICAL FIELD

The present disclosure relates generally to enclosures for use with cable systems. More particularly, the present disclosure relates to enclosures for use with cable systems where the enclosure provides a seal in various relative positions of a cover portion and a base portion of the enclosure.

BACKGROUND

Cable boxes can use a vertical engagement of a gasket to create a weatherproof seal between a top (e.g., cover) and a bottom (e.g., base) of the cable box. With a vertical engagement configuration, the gasket is typically in a groove between the top and bottom parts of a box which requires a tight closure of the box to create the weatherproof seal. A lateral engagement of an O-ring between the cover and the base can also be used. A lateral engagement configuration, however, requires tight tolerances of the cover and the base to create the weatherproof seal.

There is a need for a box that provides a weatherproof seal between a cover of the box and a base of the box in various positions of the cover relative to the base, for example, at various degrees of closure, so as to allow for a weatherproof to be formed even if some play exists between the cover and base, thus avoiding the need for tight tolerances during manufacturing.

Accordingly, it may be desirable to provide an enclosure having a seal portion that is structurally configured to provide a sealed enclosure at multiple positions of a cover portion relative to a base portion, for example, at various degrees of closure. It may be desirable to provide an enclosure that does not require tight tolerances in a latching feature in order to achieve adequate sealing of the enclosure.

SUMMARY

Embodiments of the disclosure provide an enclosure structurally configured to provide a sealed enclosure at multiple positions of a cover portion relative to a base portion. The enclosure may include a base portion, a cover portion, and a sealing portion.

In some embodiments, the base portion may include a base wall portion that extends around a perimeter of a bottom portion.

In some embodiments, the base portion may be structurally configured to define an interior volume.

In some embodiments, the cover portion may be structurally configured to be received over at least a portion of the base portion to enclose the interior volume.

In some embodiments, the cover portion may include a cover wall portion extending around a perimeter of a top portion.

In some embodiments, the sealing portion may be structurally configured to be positioned between the cover wall portion and the base wall portion.

In some embodiments, the base wall portion may be at a base wall angle relative to the bottom portion that is less than ninety degrees.

In some embodiments, the cover wall portion may be at a cover wall angle relative to the top portion that is greater than ninety degrees.

In some embodiments, at least one of the base wall portion and the cover wall portion may include a receiving portion structurally configured to receive the sealing portion;

In some embodiments, the receiving portion may be structurally configured such that the sealing portion is positioned between the base wall portion and the cover wall portion at multiple positions of the cover portion relative to the base portion.

In some embodiments, the base wall portion and the cover wall portion may be configured to be disposed in a configuration such that the base wall angle and the cover wall angle are configured to provide a weatherproof seal between the cover wall portion and the base wall portion at multiple positions of the cover portion relative to the base portion as the cover portion is received over the base portion so as to provide a sealed enclosure at multiple positions of the cover portion relative to the base portion.

In some embodiments, the receiving portion may include a recess and the sealing portion may include one of a gasket or O-ring.

In some embodiments, a cross-sectional shape of the sealing portion may be one of circular, oval, square, and polygonal.

In some embodiments, the receiving portion may be structurally configured to receive less than an entirety of the sealing portion.

In some embodiments, the base wall portion may include the receiving portion.

In some embodiments, the cover wall portion may include the receiving portion.

In some embodiments, the cover wall portion may include an inner cover wall portion and an outer cover wall, and the base wall portion may be received between the inner cover wall portion and the outer cover wall portion when the cover portion is received over the base portion.

In some embodiments, the sealing portion may be structurally configured to be positioned between the inner cover wall portion and the base wall portion.

In some embodiments, the cover portion may include one or more engagement fingers structurally configured to engage one or more engaging portions of the base portion to secure the cover portion to the base portion.

Embodiments of the disclosure provide an enclosure structurally configured to provide a sealed enclosure at multiple positions of a cover portion relative to a base portion. In some embodiments, the enclosure may include a cover portion, a base portion, and a sealing portion.

In some embodiments, the base portion may have a base wall portion extending from a bottom portion In some embodiments, the cover portion may be structurally configured to be removably attached to the base portion and to include a cover wall portion extending from a top portion.

In some embodiments, the sealing portion may be structurally configured to be positioned between the cover wall portion and the base wall portion.

In some embodiments, the base wall portion may be at a base wall angle relative to the bottom portion that is less than ninety degrees.

In some embodiments, the cover wall portion may be at a cover wall angle relative to the top portion that is greater than ninety degrees.

In some embodiments, the base wall portion and the cover wall portion may be configured to be disposed in a configuration such that base wall portion and the cover wall portion are configured to provide a weatherproof seal between the cover wall portion and the base wall portion at multiple positions of the cover portion relative to the base portion, so as to provide a sealed enclosure at multiple positions of the cover portion relative to the base portion.

In some embodiments, the base wall portion may extend around a perimeter of the base portion and the cover wall portion extends around a perimeter of the cover portion.

In some embodiments, the enclosure may include a receiving portion structurally configured to receive the sealing portion.

In some embodiments, the receiving portion may be structurally configured to receive less than an entirety of the sealing portion.

In some embodiments, the receiving portion may be positioned on one of the base wall portion and the cover wall portion.

In some embodiments, the cover portion may be structurally configured to be received over at least a portion of the base portion.

In some embodiments, the cover wall portion may include an inner wall surface portion of the cover portion and the base wall portion includes an outer wall surface of the base portion.

In some embodiments, the cover portion may include one or more engagement fingers structurally configured to engage one or more engaging portions of the base portion to secure the cover portion to the base portion.

Embodiments of the disclosure may provide an enclosure structurally configured to provide a sealed enclosure at multiple positions of a cover portion relative to a base portion. In some embodiments, the enclosure may include a base portion, a cover portion, and sealing portion.

In some embodiments, the base portion may include base wall portion.

In some embodiments, the cover portion may be structurally configured to attach the base portion.

In some embodiments, the cover portion may include a cover wall portion.

In some embodiments, the sealing portion may be structurally configured to be positioned between the cover wall portion and the base wall portion.

In some embodiments, the base wall portion and the cover wall portion may be configured to be disposed in a configuration such that base wall angle and the cover wall angle are configured to provide a weatherproof seal between the cover wall portion and the base wall portion at multiple positions of the cover portion relative to the base portion, so as to provide a sealed enclosure at multiple positions of the cover portion relative to the base portion.

In some embodiments, a securing portion may be structurally configured to secure the cover portion to the base portion.

In some embodiments, the base wall portion may be at a base wall angle relative to the bottom portion that is less than ninety degrees and the cover wall portion may be at a cover wall angle relative to the top portion that is greater than ninety degrees.

Various aspects of the system, as well as other embodiments, objects, features and advantages of this disclosure, will be apparent from the following detailed description of illustrative embodiments thereof, which is to be read in conjunction with the accompanying drawings.

DETAILED DESCRIPTION OF EMBODIMENTS

Embodiments of the disclosure provide an enclosure having an angled orientation of a base wall portion and a cover wall portion to provide weatherproof sealing between the cover portion and the base portion at multiple positions of the cover portion relative to the base portion, thereby providing a sealed enclosure at multiple positions of the cover portion relative to the base portion.

Embodiments of the disclosure may use angled sealing surfaces on both the cover portion and the base portion and a sealing portion (e.g., a gasket, O-ring, or other seal) located between the angled sealing surfaces. This structure may provide compression of the sealing portion, and therefore a seal, between the cover portion and the base portion even when the cover portion is not in the maximum overlap with the base portion (e.g., at various degrees of closure).

Embodiments may incorporate a receiving portion (e.g., a groove) on one of the wall portions of either the top portion or bottom portion of the enclosure that cradles the sealing portion. In embodiments, there may be angles employed to the wall portions that complement each other between the top portion and bottom portion, allowing the top portion to slide over the bottom portion or vise-versa and increase engagement of the sealing portion the further down the top portion is pressed onto the bottom portion. A conventional house box section of top and bottom components may look like two hollow rectangles. Whereas embodiments of the disclosure may look like two hollow trapezoids, with the sealing portion being somewhere in between the two wall portions angled relative to vertical. Embodiments may include the intentional angling of the wall portions that engage/cradle the sealing portion in order to provide pressure in both vertical (or near vertical) and horizontal (or near horizontal) directions.

Figure 1:
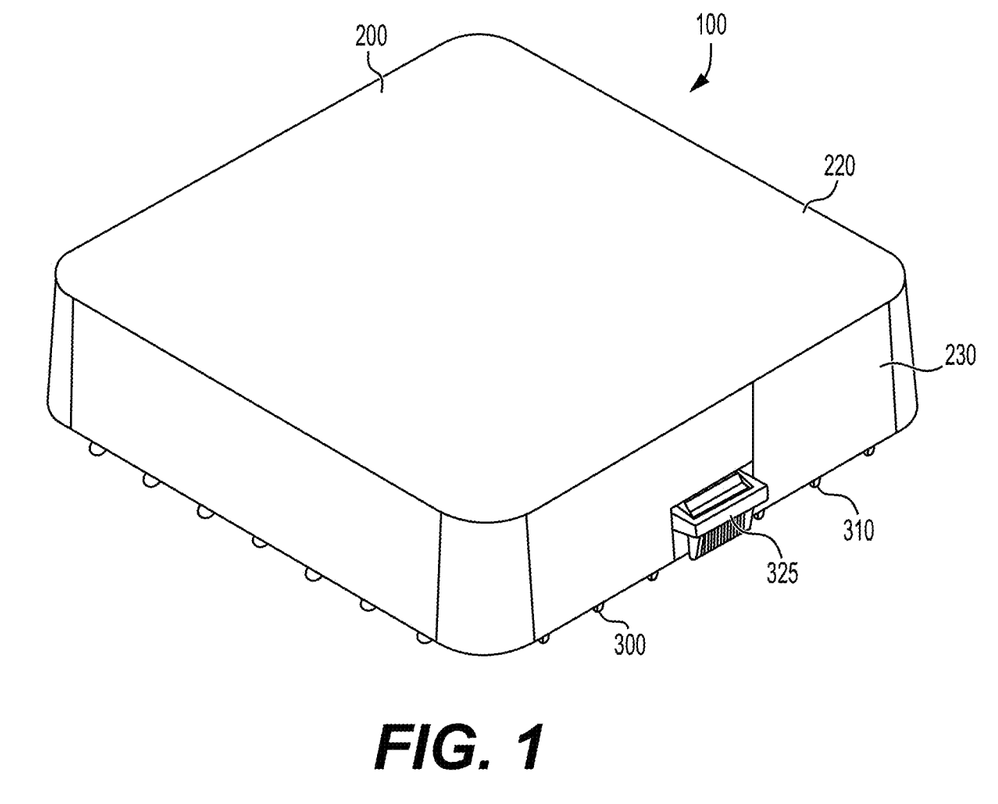
FIG. 1 is a perspective view of a cable enclosure in accordance with various aspects of the disclosure.
Figure 2:
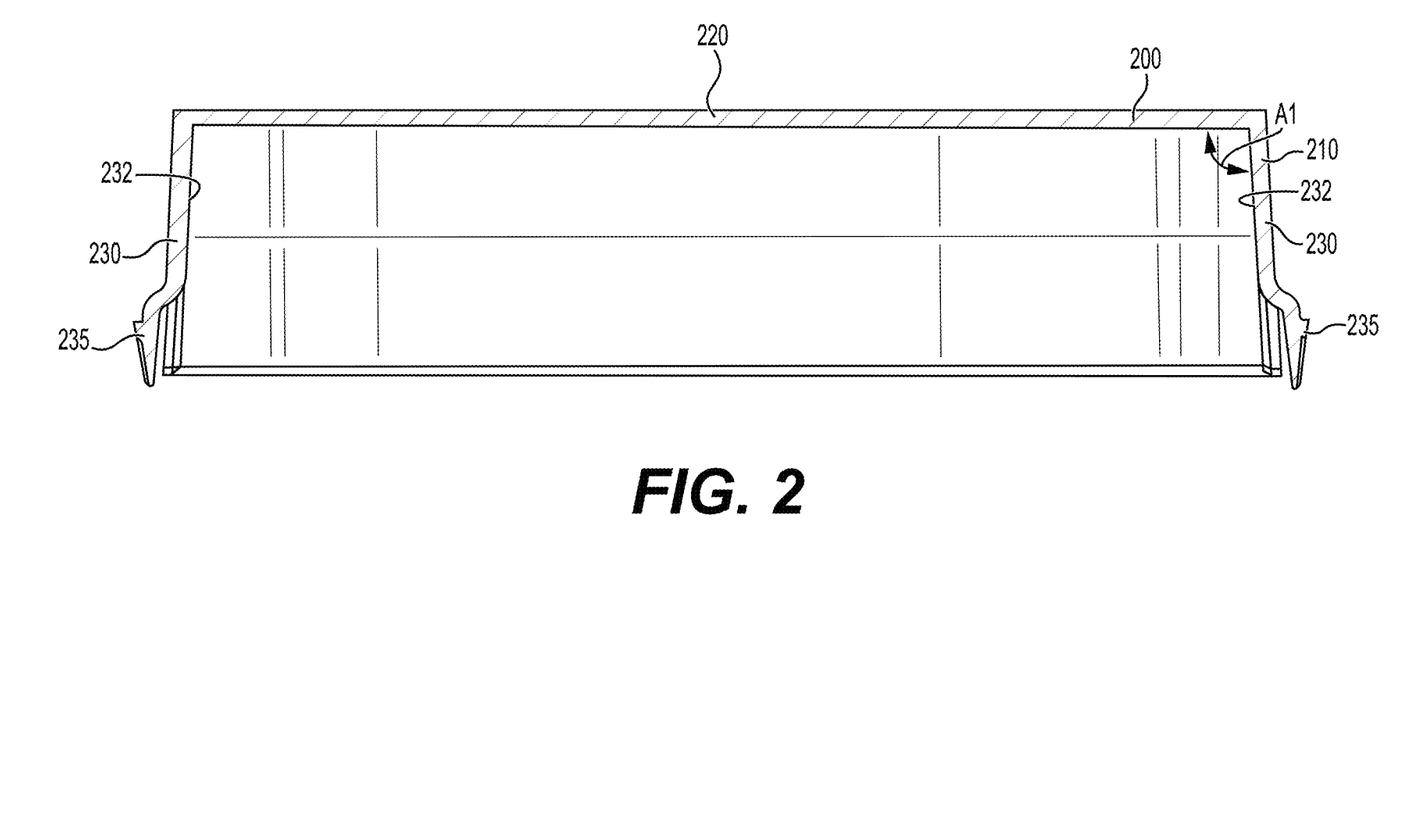
FIG. 2 is a front sectional view of a cover portion of the cable enclosure of FIG. 1.
Figure 3:
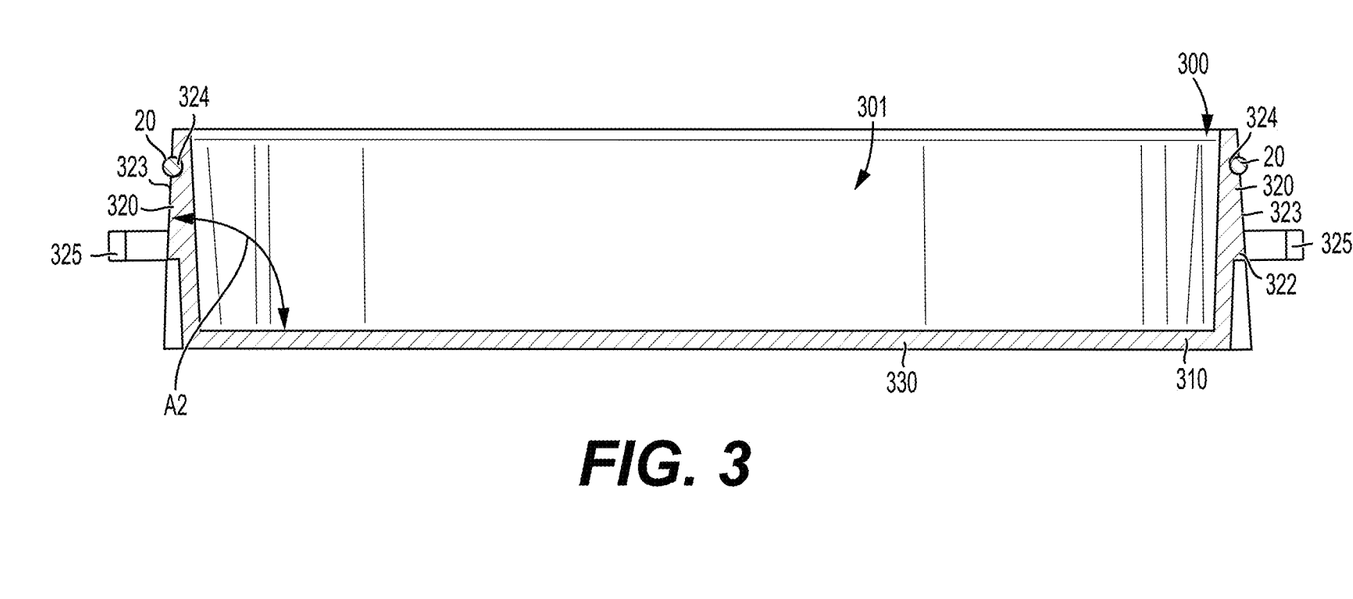
FIG. 3 is a front sectional view of a base portion of the cable enclosure of FIG. 1.

FIGS. 1-3 show an exemplary enclosure (e.g., a box) 100 in accordance with embodiments of the disclosure. In some embodiments, the enclosure 100 includes a cover portion, or top, 200 and a base portion 300. The cover portion 200 may be structurally configured to slide over the base portion to enclose an interior volume 301 of the base portion 300. In some embodiments, the cover portion 200 may have a main body 210 that includes a top portion, or plate, 220 and a cover wall portion 230. The cover wall portion may extend around a perimeter of the cover portion 200. In some embodiments, the cover portion 200 may include a securing portion structurally configured to secure the cover portion 200 to the base portion 300. In some embodiments, the securing portion may include one or more engagement fingers 235 that are structurally configured to engage engaging portions 325 of the base portion 300 to secure the cover portion 200 to the base portion 300. Other embodiments include different securing features between the cover portion 200 and the base portion 300. In some embodiments, the cover wall portion 230 may have an inside surface portion 232 that is oriented at a cover wall angle A1 other than ninety degrees relative to the top portion 220 of the cover portion 200. In some embodiments, the cover wall angle A1 may be greater than ninety degrees relative to the top portion 220.

In some embodiments, the base portion 300 may include a main body portion 310 that includes a bottom portion, or plate, 330 and a base wall portion 320. The base wall portion may extend around a perimeter of the base portion 300. In this example, the base wall portion 320 may have an outside surface portion 323 that is oriented at a base wall angle A2 other than ninety degrees relative to the bottom portion 330 of the base portion 300. In some embodiments, the base wall angle A2 may be less than ninety degrees relative to the bottom portion 330. The base wall portion 320 may also be an inside surface 322. In some embodiments, the base wall portion may include a receiving portion, or recess, 324 that is structurally configured to receive a sealing portion (for example, a gasket or O-ring) 20. In some embodiments, the inside surface 322 of the base wall portion 320 may be at a ninety degree angle relative to the bottom portion 330 of the base portion 300. In other examples, the inside surface portion 322 of the base wall portion may be at an angle other than ninety degrees relative to the bottom portion 330. In embodiments, the receiving portion 324 may be positioned in the outside surface portion 323 of the base wall portion 300. In other embodiments, the receiving portion may be positioned in the inside surface portion 232 of the cover wall portion 230. In still other examples, the cover wall portion may be configured to be positioned inside the base wall portion.

In embodiments, the receiving portion 324 may be structurally configured to receive a portion of the sealing portion 20 that is less than an entirety of the sealing portion 20. This configuration may result in a portion of the sealing portion 20 extending outside of the receiving portion 324. As the cover portion 200 is moved downward over the base portion 300, the sealing portion 20 may contact the inside wall portion 232 of the cover portion 200 and create a weatherproof seal between the cover portion 200 and the base portion 300.

Figure 4:
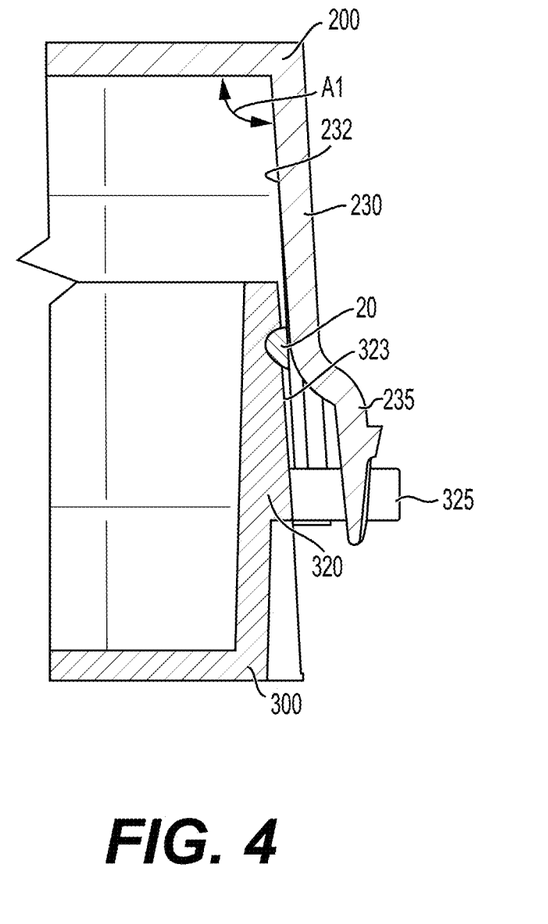
FIG. 4 is a partial sectional view of the cable enclosure of FIG. 1 with the cover portion in place on the base portion.

FIG. 4 is a partial view of the cover portion 200 in a position relative to the base portion 300 where the sealing portion 20 is deformed between the cover portion 200 and the base portion 300. This deformation may create a weatherproof seal between the cover portion 200 and the base portion 300 even though the cover portion 200 is not in its lowest, or most engaged, position relative to the base portion 300. In the position shown in FIG. 4, the engagement finger 235 of the cover portion 200 is not fully engaged with the engaging portion 325 of the base portion 300. Further movement of the cover portion 200 downward in FIG. 4 will result in the engagement finger(s) 235 being fully engaged with the engaging portion(s) 325.

Figure 5:
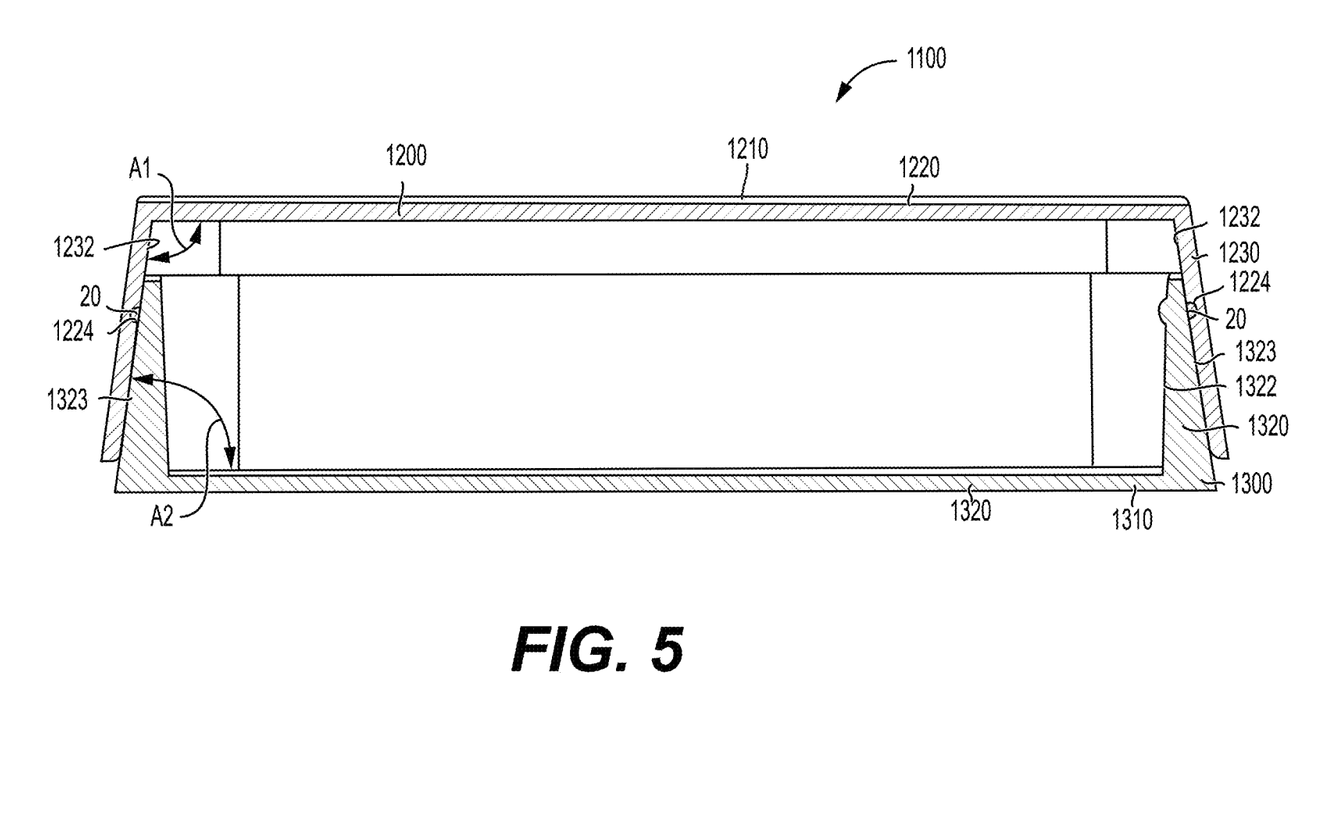
FIG. 5 is a front sectional view of a cable enclosure in accordance with various aspects of the disclosure.

FIG. 5 shows an enclosure 1100 having a cover portion 1200 and a base portion 1300. The cover portion 1200 may be structurally configured to slide over the base portion 1300. In some embodiments, the cover portion 1200 may have a main body 1210 that includes a top portion, or plate, 1220 and a cover wall portion 1230. The cover wall portion 1230 may extend around a perimeter of the cover portion 1200. In some embodiments, the cover wall portion 1230 may have an inside surface portion 1232 that is oriented at a cover wall angle A1 other than ninety degrees relative to the top portion 1220 of the cover portion 1200. In some embodiment, the cover wall angle A1 may be greater than ninety degrees relative to the top portion 1220. In some embodiments, the cover wall portion 1230 may include a receiving portion, or recess, 1224 that is structurally configured to receive a sealing portion, (e.g., a gasket or O-ring), 20. In some embodiments, the receiving portion 1224 may be in the inside surface portion 1232 of the cover wall portion 1230.

In some embodiments, the base portion 1300 may include a main body portion 1310 that includes a bottom portion, or plate, 1330 and a base wall portion 1320. The base wall portion 1320 may extend around a perimeter of the base portion 1300. In some embodiments, the base wall portion 1320 may have an outside surface portion 1323 that is oriented at a base wall angle A2 other than ninety degrees relative to the bottom portion 1330 of the base portion 1300. In some embodiments, the base wall angle A2 may be less than ninety degrees relative to the bottom portion 1330. The base wall portion 1320 may also have an inside surface portion 1322. In some embodiments, the inside surface portion 1322 of the base wall portion 1320 may be at a ninety degree angle relative to the bottom portion 1330 of the base portion 1300. In other examples, the inside surface portion 1322 of the base wall portion 1320 may be at an angle other than ninety degrees relative to the bottom portion 1330.

Figure 6:
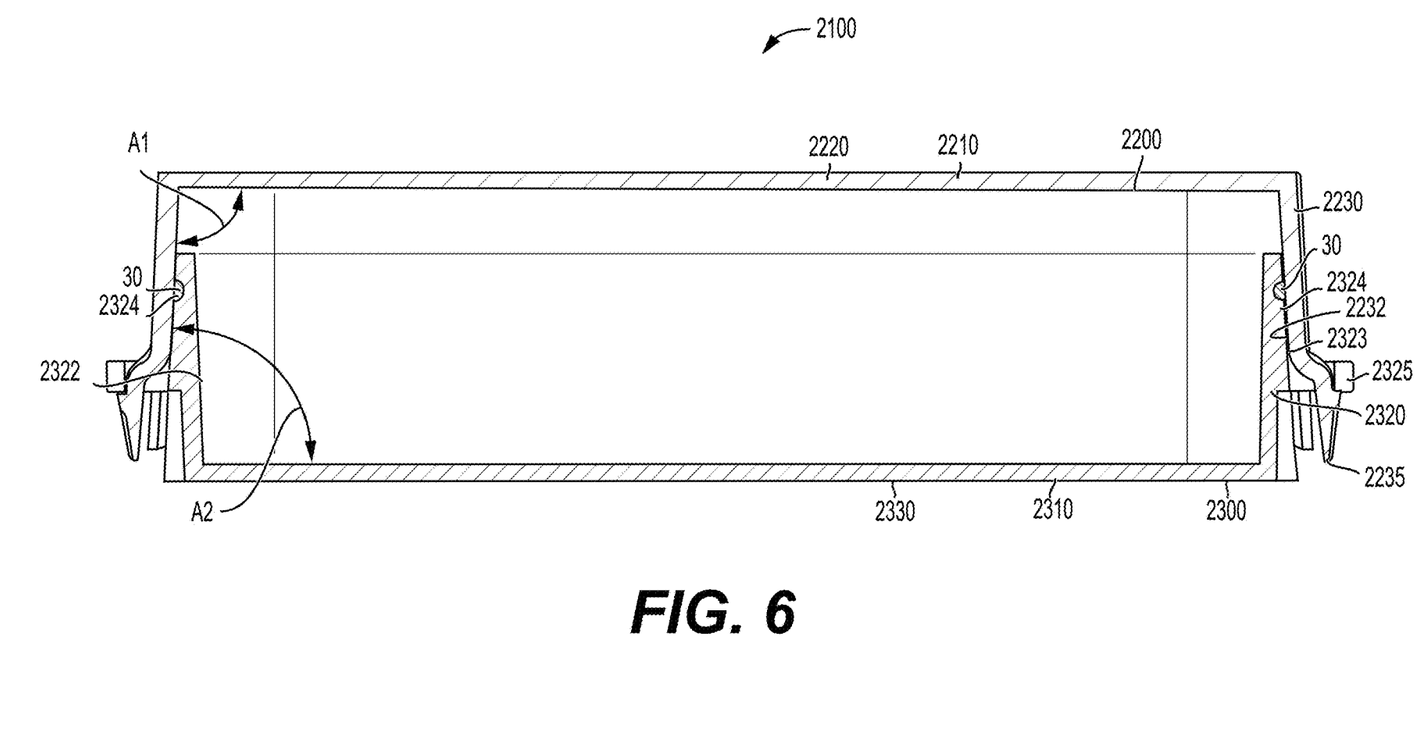
FIG. 6 is a front sectional view of a cable enclosure in accordance with various aspects of the disclosure.

FIG. 6 shows an enclosure 2100 having a cover portion 2200 and a base portion 2300. The cover portion 2200 may be structurally configured to slide over the base portion 2300. In some embodiments, the cover portion 2200 may have main body portion 2210 that includes a top portion, or plate, 2220 and a cover wall portion 2230. The cover wall portion 2230 may extend around a perimeter of the cover portion 2200. In some embodiments, the cover wall portion 2230 may have an inside surface portion 2232 that is oriented at a cover wall angle A1 other than ninety degrees relative to the top portion 2220 of the cover portion 2200. In some embodiments, the cover wall angle A1 may be greater than ninety degrees relative to the top portion 2220.

In some embodiments, the base portion 2300 may include a main body portion 2310 that includes a bottom portion, or plate, 2330 and a base wall portion 2320. The base wall portion 2320 may extend around a perimeter of the base portion 2300. In some embodiments, the base wall portion 2320 may have an outside surface portion 2323 that is oriented at a base wall angle A2 other than ninety degrees relative to the bottom portion 2330 of the base portion 2300. In some embodiments, the base wall angle A2 may be less than ninety degrees relative to the bottom portion 2330. The base wall portion 2320 may also have an inside surface portion 2322. In some embodiments, the inside surface portion 2322 of the base wall portion 1320 may be at an angle greater than ninety degree angle relative to the bottom portion 2330 of the base portion 2300. In other examples, the inside surface portion 2322 of the base wall portion 2320 may be at a ninety degree angle relative to the bottom portion 2330. In some embodiments, the base wall portion 2320 may include a receiving portion, or recess, 2324 that is structurally configured to receive a sealing portion (e.g., a gasket or O-ring), 30. In some embodiments, the receiving portion 2324 may be in an outside surface portion 2323 of the base wall portion 2320. In some embodiments, the receiving portion 2324 may be rectangular in cross-section to accommodate the sealing portion being square or rectangular in cross-section. Other embodiments may include a receiving portion that is shaped to accommodate a sealing portion that has a circular, oval, polygonal, or other cross-sectional shape.

In the example shown in FIG. 6, the cover portion 2200 may include one or more engagement fingers 2235 that are structurally configured to engage engaging portions 2325 of the base portion 2300 to secure the cover portion 2200 to the base portion 2300. Other embodiments may include different securing features between the cover portion 2200 and the base portion 2300.

Figure 7:
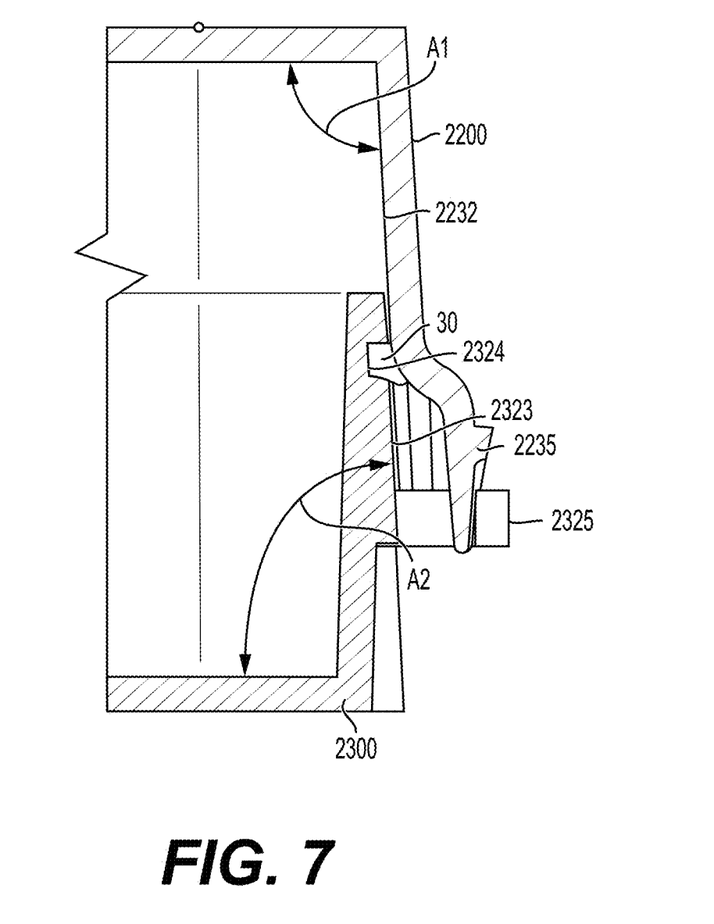
FIG. 7 is a partial sectional view of the cable enclosure of FIG. 6.

FIG. 7 is a partial view of the cover portion 2200 in a position relative to the base portion 2300 where the sealing portion 30 is deformed between the cover portion 2200 and the base portion 2300. This deformation may create a weatherproof seal between the cover portion 2200 and the base portion 2300 even though the cover portion 2200 is not in its lowest, or most engaged, position relative to the base portion 2300. In the position shown in FIG. 7, the engagement finger 2235 of the cover portion 2200 is not fully engaged with the engaging portion 2325 of the base portion 2300. Further movement of the cover portion 2200 downward in FIG. 7 will result in the engagement finger(s) 2235 being fully engaged with the engaging portion(s) 2325.

Figure 8:
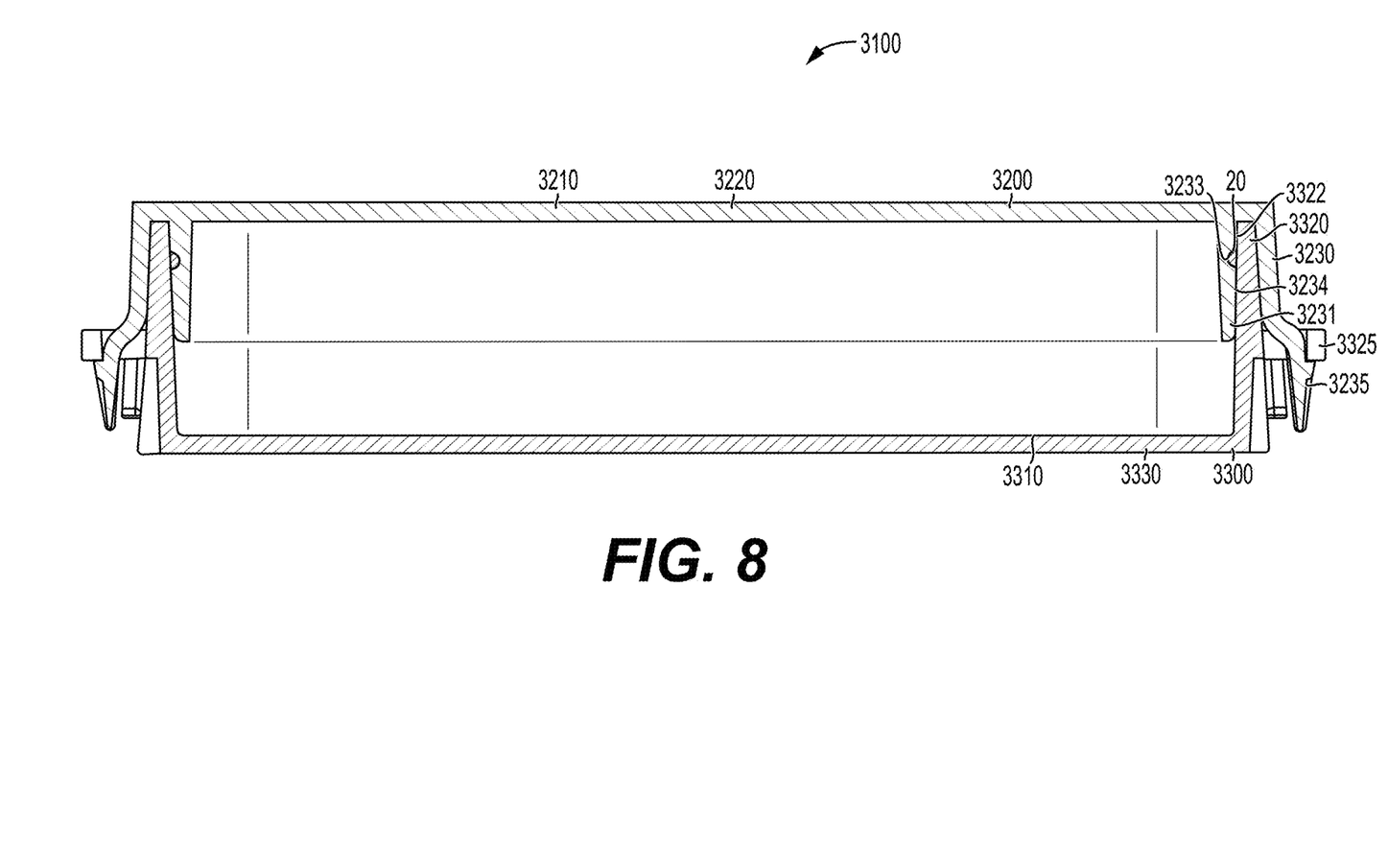
FIG. 8 is a front sectional view of a cable enclosure in accordance with various aspects of the disclosure.

FIG. 8 shows an exemplary enclosure 3100 in accordance with embodiments of the disclosure. In some embodiments, the enclosure 3100 may include a cover portion, or top, 3200 and a base portion 3300. The cover portion 3200 may be structurally configured to slide over the base portion 3300 to enclose an interior volume of the base portion 3300. In some embodiments, the cover portion 3200 may have a main body portion 3210 that includes a top portion, or plate, 3220, an inner cover wall portion 3231 and an outer cover wall portion 3230. The cover wall portions 3230, 3231 may extend around a perimeter of the cover portion 3200. In some embodiments, the cover portion 3200 may include one or more engagement fingers 3235 that are structurally configured to engage engaging portions 3325 of the base portion 3300 to secure the cover portion 3200 to the base portion 3300. Other embodiments may include different securing features between the cover portion 3200 and the base portion 3300. In some embodiments, the inner cover wall portion 3231 may have an outside surface portion 3234 that is oriented at a cover wall angle A1 other than ninety degrees relative to the top portion 3220 of the cover portion 3200. In some embodiments, the cover wall angle A1 may be less than ninety degrees relative to the top portion 3220. In some embodiments, the inner cover wall portion 3231 may include a receiving portion, or recess, 3233 that is structurally configured to receive a sealing portion (e.g., a seal, gasket, or O-ring), 20. In this example, the receiving portion 3233 may be in the outside surface portion 3234 of the inner cover wall portion 3231. In other embodiments, the receiving portion may be in the inside surface portion 2332 of the base wall portion 3320, or in an inside surface portion of the outer cover wall portion 3230.

In some embodiments, the base portion 3300 may include a main body portion 3310 that includes a bottom portion, or plate, 3330 and a base wall portion 3320. The base wall portion 3320 may extend around a perimeter of the base portion 3300. In some embodiments, the base wall portion 3320 may have an inside surface portion 3322 that is oriented at a base wall angle A2 other than ninety degrees relative to the bottom portion 3330 of the base portion 3300. In some embodiments, the base wall angle A2 may be greater than ninety degrees relative to the bottom portion 3330.

In some embodiments, the receiving portion 3233 may be structurally configured to receive a portion of the sealing portion 20 that is less than an entirety of the sealing portion 20. This configuration may result in a portion of the sealing portion 20 extending outside of the receiving portion 3233. As the cover portion 3200 is moved downward over the base portion 3300, the sealing portion 20 may contact the inside surface portion 3322 of the base wall portion 3320 of the base portion 3300 and create a weatherproof seal between the cover portion 3200 and the base portion 3300.

Figure 9:
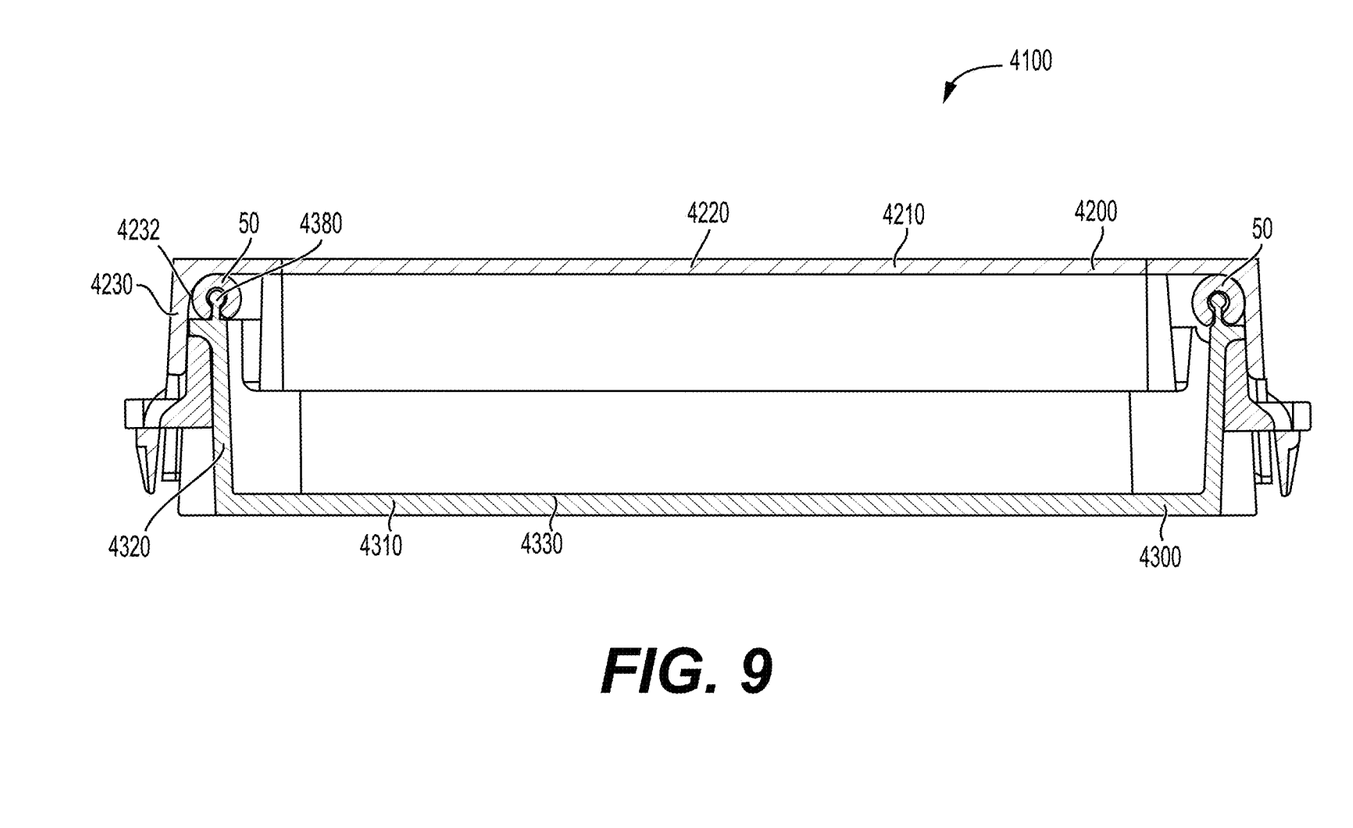
FIG. 9 is a front sectional view of a cable enclosure in accordance with various aspects of the disclosure.

FIG. 9 shows an exemplary enclosure 4100 in accordance with embodiments of the disclosure. In some embodiments, the enclosure 4100 may include a cover portion, or top, 4200 and a base portion 4300. The cover portion 4200 may be structurally configured to slide over the base portion 4300 to enclose an interior volume of the base portion 4300. In some embodiments, the cover portion 4200 may have a main body portion 4210 that includes a top portion, or plate, 4220, and a cover wall portion 4230. The cover wall portion 4230 may extend around a perimeter of the cover portion 4200. In some embodiments, the cover wall portion 4230 may have an inside surface portion 4232 that is oriented at a cover wall angle A1 other than ninety degrees relative to the top portion 4220 of the cover portion 4200. In some embodiments, the cover wall angle A1 may be greater than ninety degrees relative to the top portion 4220.

In some embodiments, the base portion 4300 may include a main body portion 4310 that includes a bottom portion, or plate, 4330 and a base wall portion 4320. The base wall portion 4320 may extend around a perimeter of the base portion 4300. In some embodiments, the base wall portion 4320 may have an engagement portion, or bead, 4380 an upper, or distal, end of the base wall portion 4320. The engagement portion 4380 may be structurally configured to receive a sealing portion 50 and retain the sealing portion 50 in position on the base wall portion 4320.

In some embodiments, as the cover portion 4200 is moved downward over the base portion 4300, the sealing portion 50 may contact the inside surface portion 4232 of the cover wall portion 4230 of the cover portion 4200 and creates a weatherproof seal between the cover portion 4200 and the base portion 4300. This weatherproof seal is created at various positions of the cover portion 4200 relative to the base portion 4300 (i.e., at various degrees of closure) due to the angled orientation of the inside surface portion 4232 of the cover wall portion 4230.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. An enclosure structurally configured to provide a sealed enclosure at multiple positions of a cover portion relative to a base portion, comprising:

a base portion having a base wall portion extending around a perimeter of a bottom portion, wherein the base portion is structurally configured to define an interior volume;

a cover portion structurally configured to be received over at least a portion of the base portion to enclose the interior volume and to include a cover wall portion extending around a perimeter of a top portion;
a sealing portion structurally configured to be positioned between the cover wall portion and the base wall portion;
wherein the base wall portion is at a base wall angle relative to the bottom portion that is less than ninety degrees;
wherein the cover wall portion is at a cover wall angle relative to the top portion that is greater than ninety degrees;
wherein one of the base wall portion and the cover wall portion comprises a receiving portion structurally configured to receive the sealing portion;
wherein the receiving portion is structurally configured such that the sealing portion is positioned between the base wall portion and the cover wall portion at multiple positions of the cover portion relative to the base portion; and
wherein the base wall portion and the cover wall portion are configured to be disposed in a configuration such that the base wall angle and the cover wall angle are configured to provide a weatherproof seal between the cover wall portion and the base wall portion at multiple positions of the cover portion relative to the base portion as the cover portion is received over the base portion so as to provide a sealed enclosure at multiple positions of the cover portion relative to the base portion.

2. The enclosure of claim 1, wherein the receiving portion includes a recess and the sealing portion includes one of a gasket or O-ring.

3. The enclosure of claim 2, wherein a cross-sectional shape of the sealing portion is one of circular, oval, square, and polygonal.

4. The enclosure of claim 1, wherein the receiving portion is structurally configured to receive less than an entirety of the sealing portion.

5. The enclosure of claim 1, wherein the base wall portion comprises the receiving portion.

6. The enclosure of claim 1, wherein the cover wall portion comprises the receiving portion.

7. The enclosure of claim 1, wherein the cover wall portion comprises an inner cover wall portion and an outer cover wall, and wherein the base wall portion is received between the inner cover wall portion and the outer cover wall portion when the cover portion is received over the base portion.

8. The enclosure of claim 7, wherein the sealing portion is structurally configured to be positioned between the inner cover wall portion and the base wall portion.

9. The enclosure of claim 8, wherein the cover portion further comprises one or more engagement fingers structurally configured to engage one or more engaging portions of the base portion to secure the cover portion to the base portion.

10. An enclosure structurally configured to provide a sealed enclosure at multiple positions of a cover portion relative to a base portion, comprising:
a base portion having a base wall portion extending from a bottom portion;
a cover portion structurally configured to be removably attached to the base portion and to include a cover wall portion extending from a top portion;
a sealing portion structurally configured to be positioned between the cover wall portion and the base wall portion;
wherein the base wall portion is at a base wall angle relative to the bottom portion that is less than ninety degrees;
wherein the cover wall portion is at a cover wall angle relative to the top portion that is greater than ninety degrees; and
wherein the base wall portion and the cover wall portion are configured to be disposed in a configuration such that base wall portion and the cover wall portion are configured to provide a weatherproof seal between the cover wall portion and the base wall portion at multiple positions of the cover portion relative to the base portion, so as to provide a sealed enclosure at multiple positions of the cover portion relative to the base portion.

11. The enclosure of claim 10, wherein the base wall portion extends around a perimeter of the base portion and the cover wall portion extends around a perimeter of the cover portion.

12. The enclosure of claim 10, further comprising a receiving portion structurally configured to receive the sealing portion.

13. The enclosure of claim 12, wherein the receiving portion is structurally configured to receive less than an entirety of the sealing portion.

14. The enclosure of claim 12, wherein the receiving portion is positioned on one of the base wall portion and the cover wall portion.

15. The enclosure of claim 10, wherein the cover portion is structurally configured to be received over at least a portion of the base portion.

16. The enclosure of claim 10, wherein the cover wall portion includes an inner wall surface portion of the cover portion and the base wall portion includes an outer wall surface of the base portion.

17. The enclosure of claim 10, wherein the cover portion further comprises one or more engagement fingers structurally configured to engage one or more engaging portions of the base portion to secure the cover portion to the base portion.

18. An enclosure structurally configured to provide a sealed enclosure at multiple positions of a cover portion relative to a base portion, comprising:
a base portion having a base wall portion;
a cover portion structurally configured to attach the base portion, the cover portion having a cover wall portion;
a sealing portion structurally configured to be positioned between the cover wall portion and the base wall portion; and
wherein the base wall portion and the cover wall portion are configured to be disposed in a configuration such that base wall angle and the cover wall angle are configured to provide a weatherproof seal between the cover wall portion and the base wall portion at multiple positions of the cover portion relative to the base portion, so as to provide a sealed enclosure at multiple positions of the cover portion relative to the base portion.

19. The enclosure of claim 18, further comprising a securing portion structurally configured to secure the cover portion to the base portion.

20. The enclosure of claim 18, wherein the base wall portion is at a base wall angle relative to the bottom portion that is less than ninety degrees and the cover wall portion is at a cover wall angle relative to the top portion that is greater than ninety degrees.

* * * * *